US011890587B2

(12) United States Patent
Grubb

(10) Patent No.: US 11,890,587 B2
(45) Date of Patent: Feb. 6, 2024

(54) BIDIRECTIONAL FLUTED AUGER

(71) Applicant: Seattle Food Tech, Inc., Seattle, WA (US)

(72) Inventor: Chloe Grubb, Seattle, WA (US)

(73) Assignee: Seattle Food Tech, Inc., Seattle, WA (US)

( * ) Notice: Subject to any disclaimer, the term of this patent is extended or adjusted under 35 U.S.C. 154(b) by 246 days.

(21) Appl. No.: 17/402,478

(22) Filed: Aug. 13, 2021

(65) Prior Publication Data
US 2023/0051218 A1      Feb. 16, 2023

(51) Int. Cl.
| | | |
|---|---|---|
| *B01F 27/192* | (2022.01) | |
| *B65G 33/14* | (2006.01) | |
| *B65G 33/34* | (2006.01) | |
| *B01F 27/70* | (2022.01) | |
| *B01F 27/72* | (2022.01) | |

(Continued)

(52) U.S. Cl.
CPC ........ *B01F 27/1921* (2022.01); *B01F 27/112* (2022.01); *B01F 27/1143* (2022.01); *B01F 27/70* (2022.01); *B01F 27/72* (2022.01); *B01F 35/3204* (2022.01); *B65G 33/14* (2013.01); *B65G 33/34* (2013.01); *B01F 2101/06* (2022.01)

(58) Field of Classification Search
CPC .. B01F 27/1143; B01F 27/1921; B01F 27/72; B01F 27/2123; B01F 2101/06; B65G 33/14; B65G 33/22; B65G 33/34; A23J 3/227; A22C 5/00
See application file for complete search history.

(56) References Cited

U.S. PATENT DOCUMENTS

| | | |
|---|---|---|
| 934,603 A | 9/1909 | Gedge |
| 4,642,241 A | 2/1987 | Noguchi |

(Continued)

FOREIGN PATENT DOCUMENTS

| | | |
|---|---|---|
| CN | 107176424 A | 9/2017 |
| CN | 110623049 A | 12/2019 |

OTHER PUBLICATIONS

International Search Report and Written Opinion in International Application No. PCT/US22/40148 dated Jan. 23, 2023.

*Primary Examiner* — Marc C Howell
*Assistant Examiner* — Patrick M McCarty
(74) *Attorney, Agent, or Firm* — Cognition IP, P.C.; Edward Steakley; Justin White

(57) ABSTRACT

An apparatus can include a hollow tube, central shaft, agitation components, and bidirectional fluted auger. The hollow tube can have an inlet, outlet, and longitudinal central axis, and can facilitate the conveyance of foodstuff materials from the inlet to the outlet. The central shaft can extend along the longitudinal axis and can be rotationally driven both clockwise and counterclockwise. The agitation components can be coupled to the central shaft and can agitate and mix foodstuff materials being conveyed along the hollow tube. The bidirectional fluted auger can be coupled to the central shaft proximate the outlet, can rotate with the central shaft when the central shaft is rotationally driven, and can have a flow rate limiting inner cylinder, clockwise-progressing flute features, and counterclockwise-progressing flute features. The clockwise and counterclockwise progressing flute features can convey foodstuff materials toward the outlet when the bidirectional fluted auger is rotated clockwise or counterclockwise.

20 Claims, 8 Drawing Sheets

(51) Int. Cl.
  *B01F 27/112* (2022.01)
  *B01F 27/1143* (2022.01)
  *B01F 35/32* (2022.01)
  *B01F 101/06* (2022.01)

(56) References Cited

U.S. PATENT DOCUMENTS

| | | | | |
|---|---|---|---|---|
| 4,941,132 | A * | 7/1990 | Horn | B01F 27/726 |
| | | | | 366/300 |
| 5,833,361 | A * | 11/1998 | Funk | B01F 27/707 |
| | | | | 366/322 |
| 6,266,504 | B1 | 7/2001 | Katoh | |
| 2010/0129520 | A1* | 5/2010 | Cabrales | B01F 27/702 |
| | | | | 99/485 |
| 2013/0094322 | A1* | 4/2013 | Bruns | A21C 1/06 |
| | | | | 366/76.1 |
| 2016/0166997 | A1* | 6/2016 | Räss | B01F 27/1125 |
| | | | | 366/279 |
| 2016/0199799 | A1* | 7/2016 | Huh | B28C 5/2036 |
| | | | | 366/24 |
| 2017/0273511 | A1 | 9/2017 | Harvey | |
| 2019/0364925 | A1* | 12/2019 | Saarinen | A23J 3/227 |
| 2021/0345642 | A1* | 11/2021 | Ait Bouziad | A23J 3/14 |

* cited by examiner

BIDIRECTIONAL FLUTED AUGER

TECHNICAL FIELD

The present disclosure relates generally to material processing, and more particularly to devices and methods that can be used in the processing of plant-based meat analogue products (hereinafter "plant-based meat").

BACKGROUND

Plant-based meat products are becoming increasingly popular and plant-based meat production is a rapidly growing industry. One important aspect of plant-based meat production is to agitate or mix various ingredients or foodstuff materials together during processing. Such foodstuff materials for plant-based meat production can include, for example, texturized vegetable protein, hydrated vegetable protein, methylcellulose, oil, and water, among other possible foodstuff materials. A common way of mixing and otherwise processing plant-based foodstuff materials together is by using a bowl chopper, blender, globe mixer, or the like.

Unfortunately, the nature of many foodstuff materials can cause issues in these agitating and mixing processes, such as clumping, lumping, and even clogging. This often results in interrupted outputs from traditional processing methods, as wet or soggy processed materials can be highly viscous and require manual loading and unloading. Interrupted outputs at one stage of an overall plant-based meat production process can then negatively affect the quality and output consistency of downstream stages of the process.

Although traditional ways of processing plant-based meat products have worked adequately in the past, improvements are always welcome. In particular, what is desired are improved systems and methods for agitating, mixing, and conveying foodstuff materials that result in little to no clumping or lumping of the foodstuff materials being processed, such that a steady output flow rate can be achieved.

SUMMARY

It is an advantage of the present disclosure to provide improved systems and methods for processing materials, such as plant-based foodstuff materials. The disclosed features, apparatuses, systems, and methods provide improved processing solutions that result in continuous and consistent production, with little to no clumping, manual interventions or other interruptions, or output staggering of the foodstuff or other materials being processed. These advantages can be accomplished at least in part by using a bidirectional fluted auger configured to convey materials being processed toward an outlet at a relatively steady flow rate when the bidirectional fluted auger is rotating clockwise and also when the bidirectional fluted auger is rotating counterclockwise.

In various embodiments of the present disclosure, an apparatus configured to process foodstuff materials can include a hollow tube, a central shaft, a plurality of agitation and/or conveyance components, and a bidirectional fluted auger. The hollow tube can have an inlet and an outlet, can define a longitudinal central axis, and can be configured to facilitate the conveyance of foodstuff materials from the inlet to the outlet. The central shaft can extend along the longitudinal axis and can be configured to be rotationally driven in clockwise and counterclockwise directions. The plurality of agitation and/or conveyance components can be coupled to the central shaft and can be configured to agitate and mix the foodstuff materials being conveyed along the hollow tube. The bidirectional fluted auger can be coupled to the central shaft proximate the outlet and can be configured to rotate with the central shaft when the central shaft is rotationally driven. The bidirectional fluted auger can have a flow rate limiting inner cylinder, clockwise-progressing flute features coupled to an outer surface of the flow rate limiting inner cylinder, and counterclockwise-progressing flute features coupled to the outer surface of the flow rate limiting inner cylinder. The clockwise-progressing flute features can convey the foodstuff materials toward the outlet more than the counterclockwise-progressing flute features convey the foodstuff materials away from the outlet when the bidirectional fluted auger is rotated clockwise, and the counterclockwise-progressing flute features can convey the foodstuff materials toward the outlet more than the clockwise-progressing flute features convey the foodstuff materials away from the outlet when the bidirectional fluted auger is rotated counterclockwise.

In various detailed embodiments, the bidirectional fluted auger can be located at an outlet end of the central shaft, and the diameter of the flow rate limiting inner cylinder can be greater than the diameter of the central shaft. The clockwise-progressing flute features can include a plurality of clockwise oriented flutes that each extend along the flow rate limiting inner cylinder at a distance between about one-half to one whole rotation of the flow rate limiting inner cylinder. Similarly, the counterclockwise-progressing flute features can include a plurality of counterclockwise oriented flutes that each extend along the flow rate limiting inner cylinder at a distance between about one-half to one whole rotation of the flow rate limiting inner cylinder. The clockwise-progressing flute features and the counterclockwise-progressing flute features can be interwoven with respect to each other, and the clockwise-progressing flute features can include at least two separate clockwise oriented flutes while the counterclockwise-progressing flute features can include at least two separate counterclockwise oriented flutes. In some embodiments three of each set of flutes can be used. This interwoven nature is what allows the progressing flute features to convey the foodstuff materials when the bidirectional fluted auger is rotated clockwise and also when it is rotated counterclockwise.

In various arrangements, the foodstuff materials can include dry texturized vegetable protein and water that are mixed and conveyed by the apparatus to form hydrated vegetable protein. The hollow tube outlet can feed the foodstuff materials to a separate set of fluted infeed screws, which can be asymmetric with respect to each other. Variations in the flow rate of the foodstuff materials from the outlet when the rotation of the bidirectionally fluted auger is alternated between clockwise and counterclockwise can be substantially less than variations in the flow rate of the foodstuff materials from the outlet when the rotation of the bidirectionally fluted auger is constantly clockwise or constantly counterclockwise. In some arrangements, the apparatus can further include a motor coupled to the central shaft and configured to drive the central shaft rotationally in clockwise and counterclockwise directions, as well as a controller coupled to the motor and configured to operate the motor to drive the central shaft rotationally clockwise and counterclockwise at regularly defined intervals.

In various further embodiments of the present disclosure, a fluted conveyance can include a cylinder, a plurality of clockwise-progressing flute features, and a plurality of counterclockwise-progressing flute features. The cylinder can have an outer surface, a front end, a back end, and a longitudinal rotational axis, and the cylinder can be configured to rotate in clockwise and counterclockwise directions. The plurality of clockwise-progressing flute features can be coupled to the outer surface of the cylinder, and these clockwise-progressing flute features can convey a subject material toward the back end of the cylinder at a first flow rate when the cylinder is rotated clockwise and can convey the subject material toward the front end of the cylinder at a second flow rate when the cylinder is rotated counterclockwise. The plurality of counterclockwise-progressing flute features can be coupled to the outer surface of the cylinder, and these counterclockwise-progressing flute features can convey the subject material toward the back end of the cylinder at a third flow rate when the cylinder is rotated counterclockwise and can convey the subject material toward the front end of the cylinder at a fourth flow rate when the cylinder is rotated clockwise. The first flow rate can be greater than the fourth flow rate to result in an overall clockwise positive flow rate of the subject material toward the back end of the cylinder when the cylinder is rotated clockwise. The third flow rate can be greater than the second flow rate to result in an overall counterclockwise positive flow rate of the subject material toward the back end of the cylinder when the cylinder is rotated counterclockwise.

In various detailed embodiments, the plurality of counterclockwise-progressing flute features and the plurality of counterclockwise-progressing flute features can all be located proximate the back end of the cylinder. Also, the plurality of clockwise-progressing flute features can include clockwise oriented flutes that each extend along the cylinder at a distance between about one-half to one whole rotation of the cylinder, and the plurality of counterclockwise-progressing flute features can include counterclockwise oriented flutes that each extend along the cylinder at a distance between about one-half to one whole rotation of the cylinder. The clockwise-progressing flute features and the counterclockwise-progressing flute features are interwoven with respect to each other. In various arrangements, the subject material can include a foodstuff.

In still further embodiments of the present disclosure, various methods of conveying foodstuff materials are provided. Pertinent process steps can include providing a first foodstuff material into an inlet of a foodstuff conveying device having an inlet, an outlet, and a rotating conveyor, inputting a second foodstuff material into the inlet, rotating clockwise the rotating conveyor, rotating counterclockwise the rotating conveyor, and collecting the first and second foodstuff materials at the outlet. The step of rotating clockwise can result in the first and second foodstuff materials being conveyed from the inlet to the outlet, and the step of rotating counterclockwise can also result in the first and second foodstuff materials being conveyed from the inlet to the outlet. The steps of rotating clockwise and rotating counterclockwise can further result in agitating and mixing the first and second foodstuff materials together.

Other apparatuses, methods, features, and advantages of the disclosure will be or will become apparent to one with skill in the art upon examination of the following figures and detailed description. It is intended that all such additional apparatuses, methods, features, and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed apparatuses, systems and methods for processing foodstuff materials using bidirectional fluted augers. These drawings in no way limit any changes in form and detail that may be made to the disclosure by one skilled in the art without departing from the spirit and scope of the disclosure.

DETAILED DESCRIPTION

Figure 1:
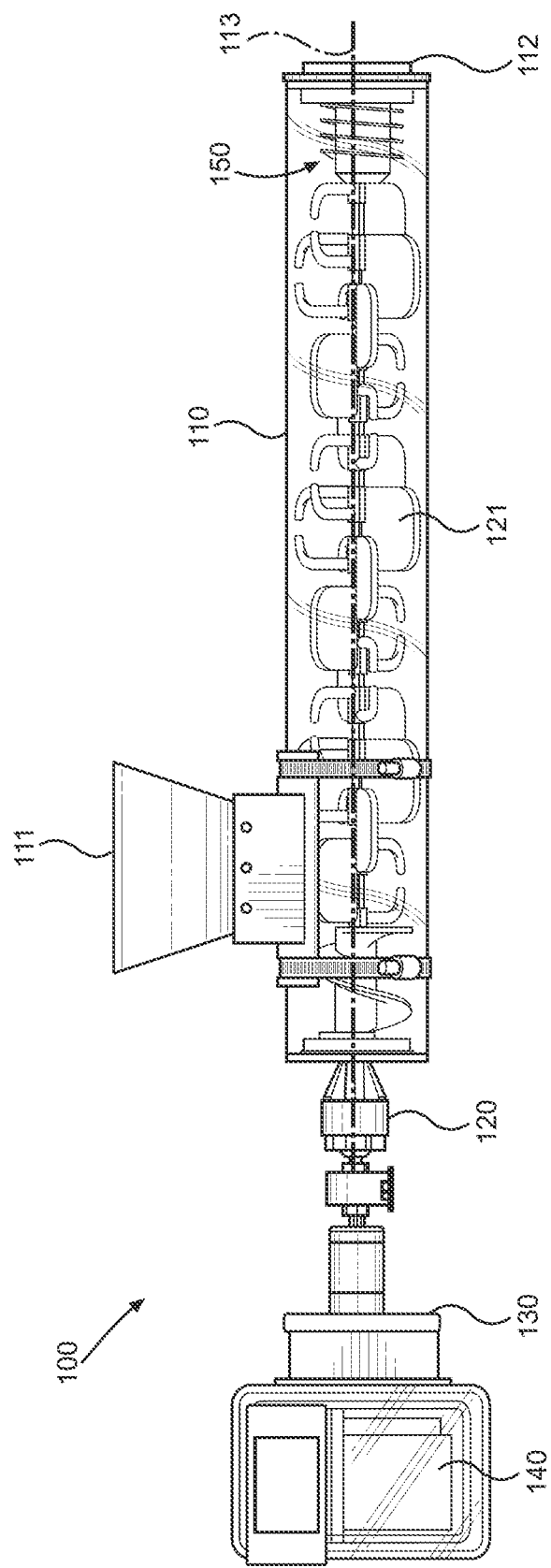
FIG. 1 illustrates in side elevation view an example foodstuff conveying device according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, that other embodiments may be used, and that changes may be made without departing from the spirit and scope of the disclosure.

The present disclosure relates in various embodiments to features, apparatuses, systems, and methods for processing materials. The disclosed embodiments can be specifically used for agitating, mixing, and conveying foodstuff materials, for example, such as in the production of plant-based meat products. In particular, the disclosed embodiments can utilize a foodstuff material conveying device having a bidirectional fluted auger to progress foodstuff materials while conveying them at a relatively steady flow rate toward a device outlet when the auger rotates clockwise and also when the auger rotates counterclockwise.

Traditional fluted augers convey materials toward a desired outlet only when the fluted auger rotates in a specific direction, since reversing the rotational direction then conveys the materials in the opposite direction away from the outlet (i.e., backwards). In practice, this can result in clumping, lumping, or clogging of the materials being mixed and conveyed during continuous rotational use, particularly when the materials being conveyed are wet or soggy solid materials. These issues can then result in inconsistent flow rates during continuous production. Unlike traditional fluted augers, the disclosed bidirectional fluted augers can be formed with separate clockwise-progressing flute features and counterclockwise-progressing flute features. This can result in the conveyed materials being pushed toward an outlet end of the bidirectional fluted auger when the bidirectional fluted auger is rotating clockwise and also when it is rotating counterclockwise. By oscillating the rotation of the bidirectional fluted auger back and forth, a more steady and consistent output flow rate can be achieved.

Although various embodiments disclosed herein discuss mixing, agitating, and conveying specific foodstuff materials for purposes of illustration, it will be readily appreciated that the disclosed features, apparatuses, systems, and methods can similarly be used for any relevant mixing and conveying of other foodstuff materials and/or any other pertinent materials. In some situations, the disclosed bidirectional fluted auger can also be used to convey materials that are not foodstuff based, such that it can simply be called a conveyor. For example, the disclosed bidirectional fluted auger can also be used with concrete or sediment mixing, spray coating processing, and/or other industrial processing arrangements. Other applications, arrangements, and extrapolations beyond the illustrated embodiments are also contemplated.

Referring first to FIG. 1, an example foodstuff conveyance device is shown in side elevation view. Foodstuff conveyance device 100 can be an apparatus or an overall system configured to agitate, mix, and convey foodstuff materials. Various different foodstuff materials can be used for this mixing, agitation, and conveying, and it is contemplated that the foodstuff materials can be in the form of small pieces, flakes, powders, and/or liquids. In one specific non-limiting example for purposes of illustration, the foodstuff materials can be texturized vegetable protein and water, which are agitated and mixed together in the foodstuff conveyance device 100 to form hydrated vegetable protein. Of course, other foodstuff materials can also be used as may be desired.

In general, foodstuff conveyance device 100 can include a hollow tube 110, a central shaft 120 having a plurality of agitation components 121, a rotational motor 130, a controller 140, and a bidirectional fluted auger 150, among other possible components. Hollow tube 110 can have an inlet 111 and outlet 112, can define a longitudinal central axis 113 running therethrough, and can be configured to facilitate the conveyance of foodstuff materials from the inlet 111 to the outlet 112. Inlet 111 can be in the form of a hopper configured to intake the foodstuff materials, such as texturized vegetable protein and water. Central shaft 120 can extend along longitudinal axis 113 and can be configured to be rotationally driven in clockwise and counterclockwise directions by rotational motor 130. Agitation components 121 can be coupled to the central shaft 120 and can be configured to agitate and mix the foodstuff materials being conveyed along the hollow tube 110 from the inlet 111 toward the outlet 112.

Controller 140 can include a processor configured to control the rotational direction and speed of motor 130 and can also include a user interface such as a touchscreen, keypad, buttons, or the like. One or more programs can be configured using controller 140 to control electronically and automatically the rotation of central shaft 120. In various arrangements, controller 140 can rotate central shaft 120 (and agitation components 121 and bidirectional fluted auger 150 correspondingly) clockwise for a first set speed and first time interval and then counterclockwise for a second set speed and second time interval. Alternatively, numbers of rotations may be used. For example, rotation can be set at a 4:3 ratio or interval, such that 4 clockwise are made, and then direction is reversed for 3 counterclockwise rotations. This 4:3 oscillating rotations process can then be repeated indefinitely so long as continuous processing or production is desired. Other ratios or intervals may also be used, such as 6:5, 1:1, or any other number of rotations desired in both directions.

Bidirectional fluted auger 150 can be coupled to central shaft 120 within hollow tube 110 and proximate outlet 112. Bidirectional fluted auger 150 can be configured to rotate with central shaft 120 when the central shaft is rotationally driven and can include a flow rate limiting inner cylinder, clockwise-progressing flute features coupled to an outer surface of the flow rate limiting inner cylinder, and counterclockwise-progressing flute features coupled to the outer surface of the flow rate limiting inner cylinder, among other possible components. Due to these uniquely arranged features, bidirectional fluted auger 150 can be configured to convey foodstuff materials toward outlet 112 at a steady flow rate when it is rotated clockwise and also when rotation is reversed and it is rotated counterclockwise, as set forth in greater detail below.

Figure 2A:
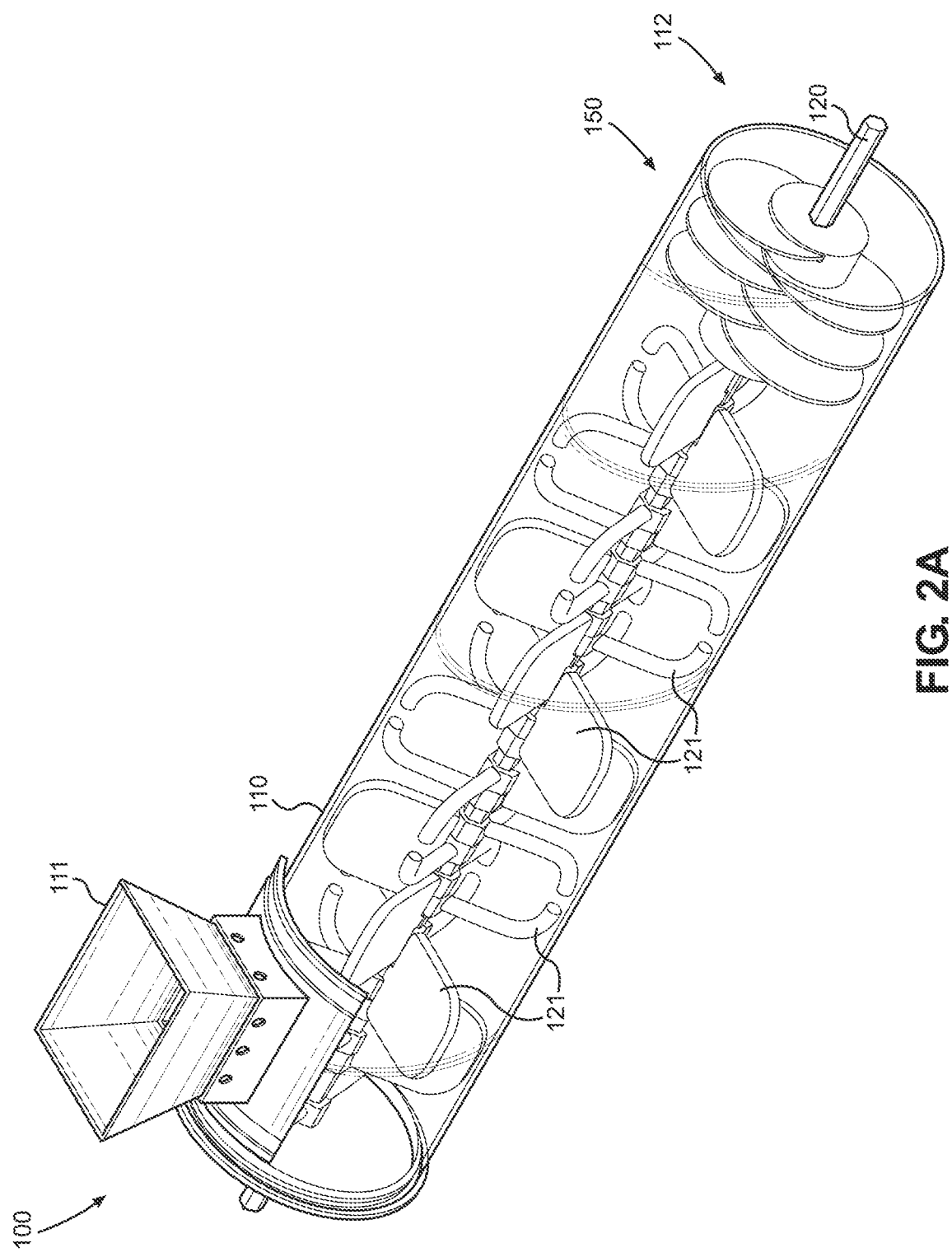
FIG. 2A illustrates in side perspective view an example tube portion of the foodstuff conveying device of FIG. 1 according to one embodiment of the present disclosure.
Figure 2B:
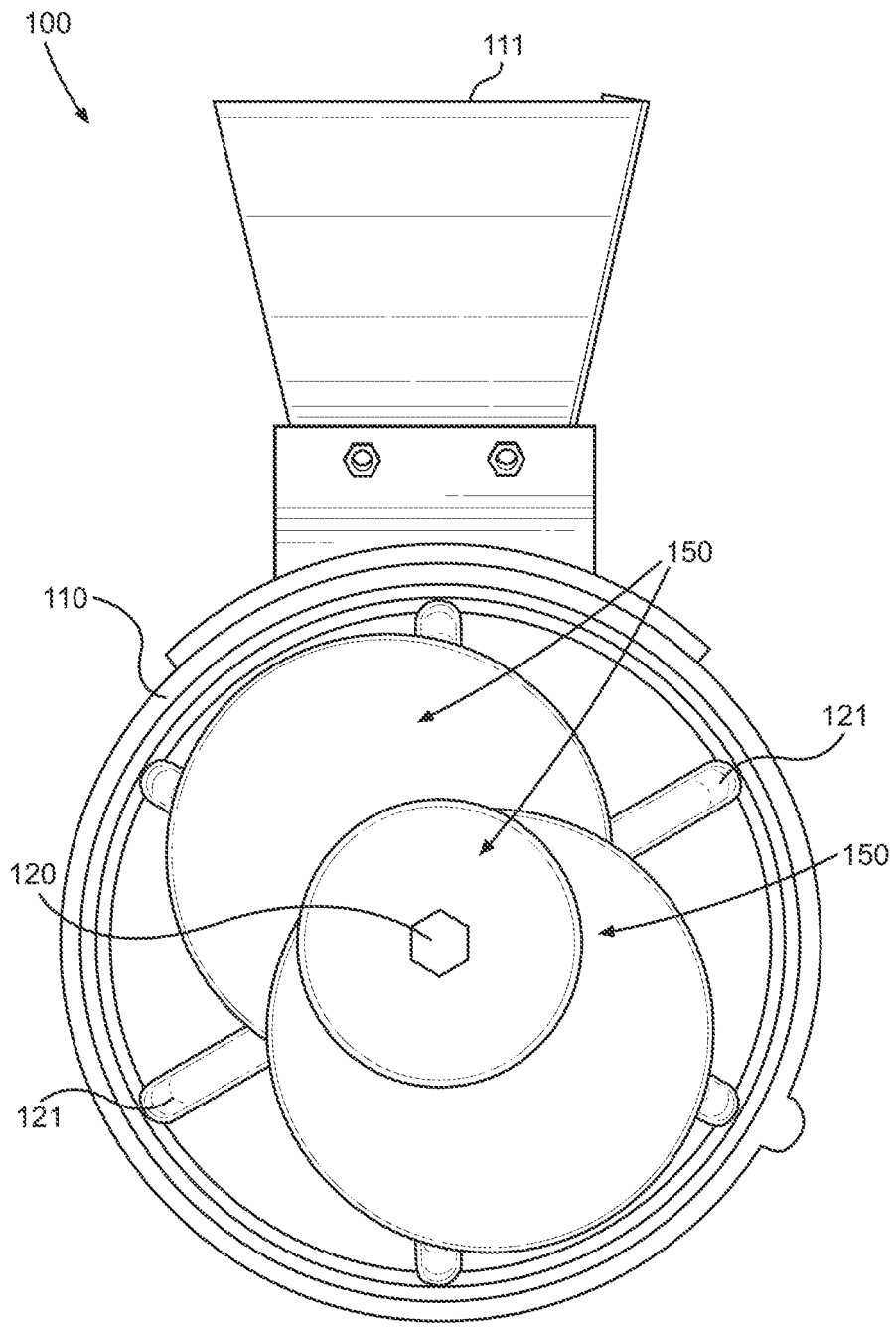
FIG. 2B illustrates in rear end (i.e., outlet end) elevation view the tube portion of the foodstuff conveying device of FIG. 2B according to one embodiment of the present disclosure.

Turning next to FIGS. 2A and 2B, an example tube portion of the foodstuff conveying device of FIG. 1 is shown side perspective and rear end (i.e., outlet end) elevation views respectively. These figures depict foodstuff conveyance device 100 in closer views without the motor and controller being shown. Again, a hopper or inlet 111 can receive foodstuff materials being dropped into hollow tube 110, where the materials are then agitated and mixed by rotating agitation components 121 and conveyed from inlet 111 to outlet 112 by rotating bidirectional fluted auger 150. Rotation of agitation components 121 and bidirectional fluted auger 150 can correspond directly to rotation of central shaft 120 to which they can be directly affixed or otherwise coupled. As shown, bidirectional fluted auger 150 can be located after agitation components 121 along a general materials flow path and at or proximate outlet 112, such as at a back end of central shaft 120.

As will be readily appreciated, the disclosed bidirectional fluted auger and foodstuff conveying device can represent one stage of an overall plant-based meat production having many different stages. As such, foodstuff materials entering foodstuff conveyance device 100 at inlet 111 can come from another overall production stage, while agitated, mixed, and conveyed foodstuff materials exiting at outlet 112 can go to yet another overall production stage. In the specific non-limiting illustrative example provided herein, hydrated vegetable protein can exit outlet 112 to be fed directly into a following overall process stage involving other foodstuff materials and asymmetric fluted infeeds or augers. Further details regarding such next overall stage components are provided in commonly owned U.S. Nonprovisional patent application Ser. No. 17/402,468, filed Aug. 13, 2021, and titled "ASYMMETRIC FLUTED INFEEDS," which is incorporated by reference in its entirety herein.

Figure 3:
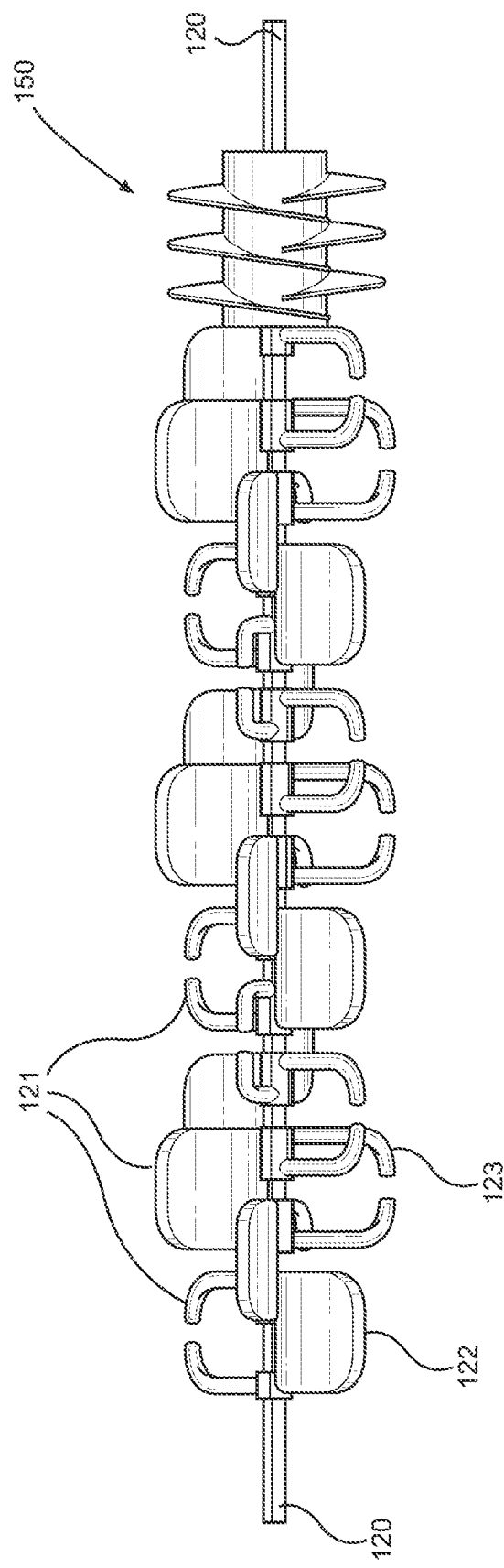
FIG. 3 illustrates in side elevation view an example central shaft and associated components of the foodstuff conveying device of FIG. 1 according to one embodiment of the present disclosure.

Continuing with FIG. 3, an example central shaft and associated components are illustrated in side elevation view. Again, central shaft 120 can be rotationally driven in alternating clockwise and counterclockwise directions by a rotational motor, and bidirectional fluted auger 150 can be coupled to central shaft 120 at a back end thereof such that the bidirectional fluted auger rotates with the central shaft. Agitation components 121 coupled to central shaft 120 can include various flat portions 122 and hooks 123, which serve to agitate and mix the materials being conveyed during rotational operation of the central shaft. Further details regarding agitation components 121 are provided in commonly owned U.S. Provisional Patent Application No. 63/130,369, filed Dec. 23, 2020, and titled "PROGRESSIVE HYDRATION AND POST-PROCESSING SYSTEM," which is incorporated by reference in its entirety herein. Further details regarding the overall production process including all of these components and other process stages are provided in commonly owned U.S. Provisional Patent Application No. 63/118,597 filed Nov. 25, 2020, and titled "CONTINUOUS PROCESS FOR AUTOMATED PLANT-BASED MEAT ANALOGUE PRODUCTION," which is also incorporated by reference in its entirety herein.

Figure 4:
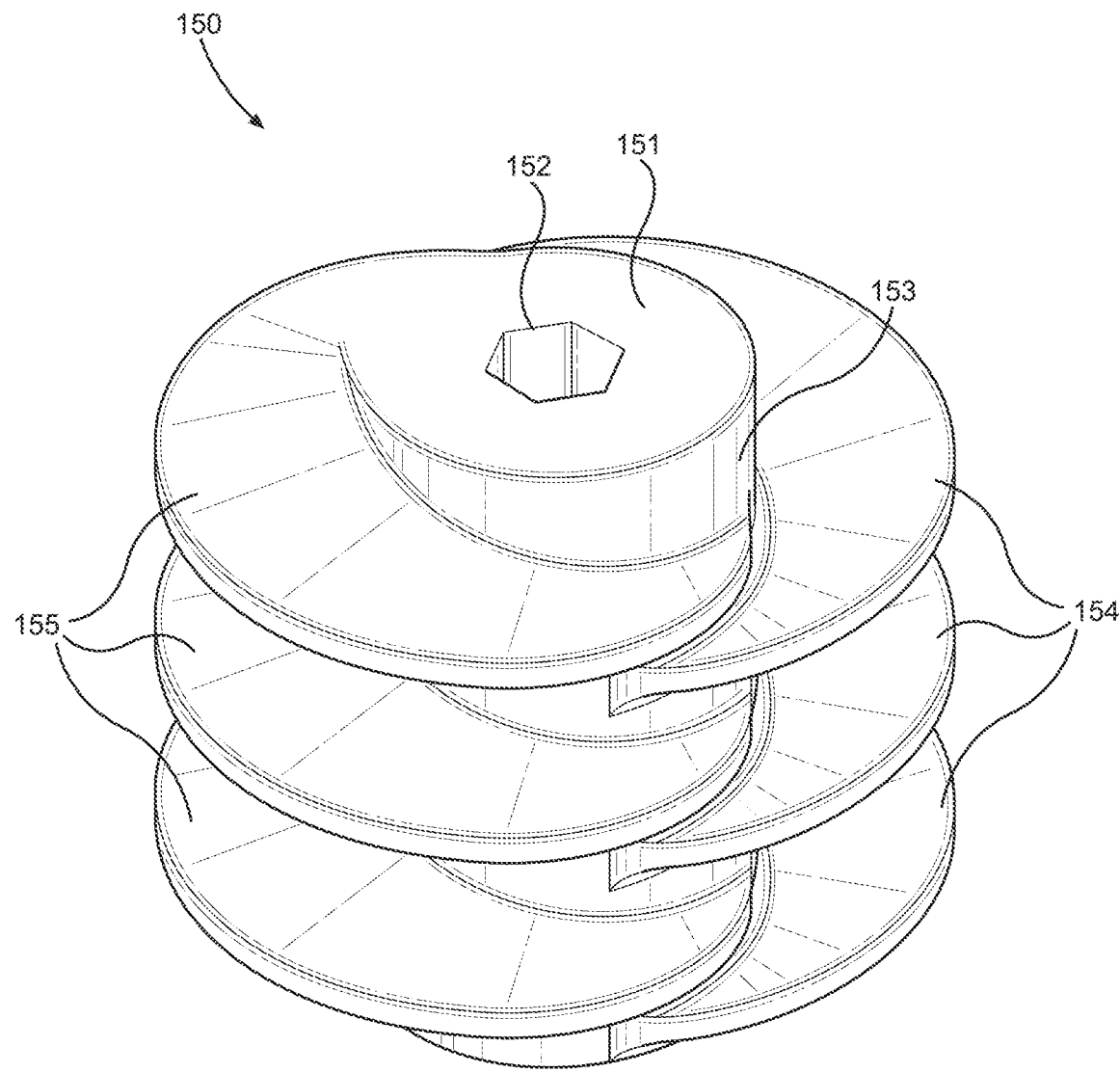
FIG. 4 illustrates in side perspective view an example bidirectional fluted auger of the foodstuff conveying device of FIG. 1 according to one embodiment of the present disclosure.

Focusing now on FIG. 4, an example bidirectional fluted auger is shown in side perspective view. Bidirectional fluted auger 150 can be located at a back end or otherwise proximate an outlet of a foodstuff conveying device as shown in the disclosed examples, although other locations and devices are also possible in alternative arrangements. For example, a longer similar bidirectional fluted auger with more flutes can fill more or all of a hollow tube, trough, or other conveyance device, and/or can be located at the front, middle, or back of the conveyance device. In general, bidirectional fluted auger 150 can convey or drive the flow of materials in a single front to back direction in a hollow tube or other conveyance device regardless of whether it is being rotated clockwise or counterclockwise. This can allow an alternating or oscillating rotation of the bidirectional fluted auger 150 while still providing a continuous flow of conveyed materials in a single front to back direction of the auger.

In various arrangements, bidirectional fluted auger 150 can have a core or inner cylinder 151 having a central hole 152 or other mounting feature and an outer surface 153. Central hole 152 can be used to mount or otherwise couple bidirectional fluted auger 150 to a rotationally driven central shaft, as noted above. In some embodiments, inner cylinder 151 can be flow rate limiting when used in conjunction with an overall foodstuff conveying device. For example, the diameter of inner cylinder 152 can be greater than the diameter of the central shaft to which bidirectional fluted auger 150 is coupled, such that flow through the overall foodstuff conveying device is throttled or limited due to this larger diameter.

Bidirectional fluted auger 150 can also include two or more clockwise-progressing flute features 154 coupled to outer surface 153 of the flow rate limiting inner cylinder 151, as well as two or more counterclockwise-progressing flute features 155 coupled to the outer surface of the flow rate limiting inner cylinder. As shown, flute features 154, 155 can be broken up and interwoven with respect to each other, rather than being continuous flutes as is typical for traditional screw conveyor devices. As will be readily appreciated, each set of two or more flute features 154, 155 can be configured to convey materials as bidirectional fluted auger 150 rotates in a clockwise or counterclockwise direction.

However, clockwise-progressing flute features 154 can convey foodstuff materials toward an outlet (i.e., front to back or "forward" direction) more than the counterclockwise-progressing flute features 155 convey those foodstuff materials away from the outlet (i.e., back to front or "backward" direction) when bidirectional fluted auger 150 is rotated clockwise. Similarly, counterclockwise-progressing flute features 155 can convey the foodstuff materials toward the outlet more than the clockwise-progressing flute features 154 convey the foodstuff materials away from the outlet when bidirectional fluted auger 150 is rotated counterclockwise.

This result can be due to the way that flute features 154, 155 are shaped and arranged. As shown, clockwise-progressing flute features 154 can include three clockwise oriented flutes that each extend along flow rate limiting inner cylinder 151 at a distance between about one-half to one whole rotation of the flow rate limiting inner cylinder. Similarly, counterclockwise-progressing flute features 155 can include three counterclockwise oriented flutes that each extend along flow rate limiting inner cylinder 151 at a distance between about one-half to one whole rotation of the flow rate limiting inner cylinder. Although three of each set of flute features 154, 155 are shown as a specific example, it will be readily appreciated that more or fewer flute features can alternatively be used. At least two flute features in each set can be used in many arrangements. Also, clockwise-progressing flute features 154 and counterclockwise-progressing flute features 155 can be interwoven, such that materials being conveyed are constantly being passed from a flute feature in one set of flute features to another flute feature in the opposite set of flute features during rotation of bidirectional fluted auger 150.

In some arrangements, each flute feature can have a front surface and back surface. All front surfaces can be pushing or driving the conveyed materials during clockwise rotations of bidirectional fluted auger 150, while all back surfaces can then be pushing or driving the conveyed materials during counterclockwise rotations. Various design features of these flute features can result in one surface being dominant when rotation is in one direction while the opposite surface is dominant when rotation is in the other direction. In some arrangements, the effective surface area or length of one side of a flute feature can be greater to effect more push or conveyance forward toward an outlet for one directional rotation, while the effective surface area or length of the opposite side of that flute feature can be smaller to effect less push or conveyance backward away from the outlet for the opposite directional rotation. In some arrangements, the surface slope of one side of a flute feature can be more sharply inclined to effect more push or conveyance forward for one directional rotation, while the surface slope of the opposite side of that flute feature can be less sharply inclined or even flat to effect less push or conveyance backward for the opposite directional rotation. Other types of flute feature shapes and arrangements can alternatively or also be used to achieve this desired result.

Figure 5:
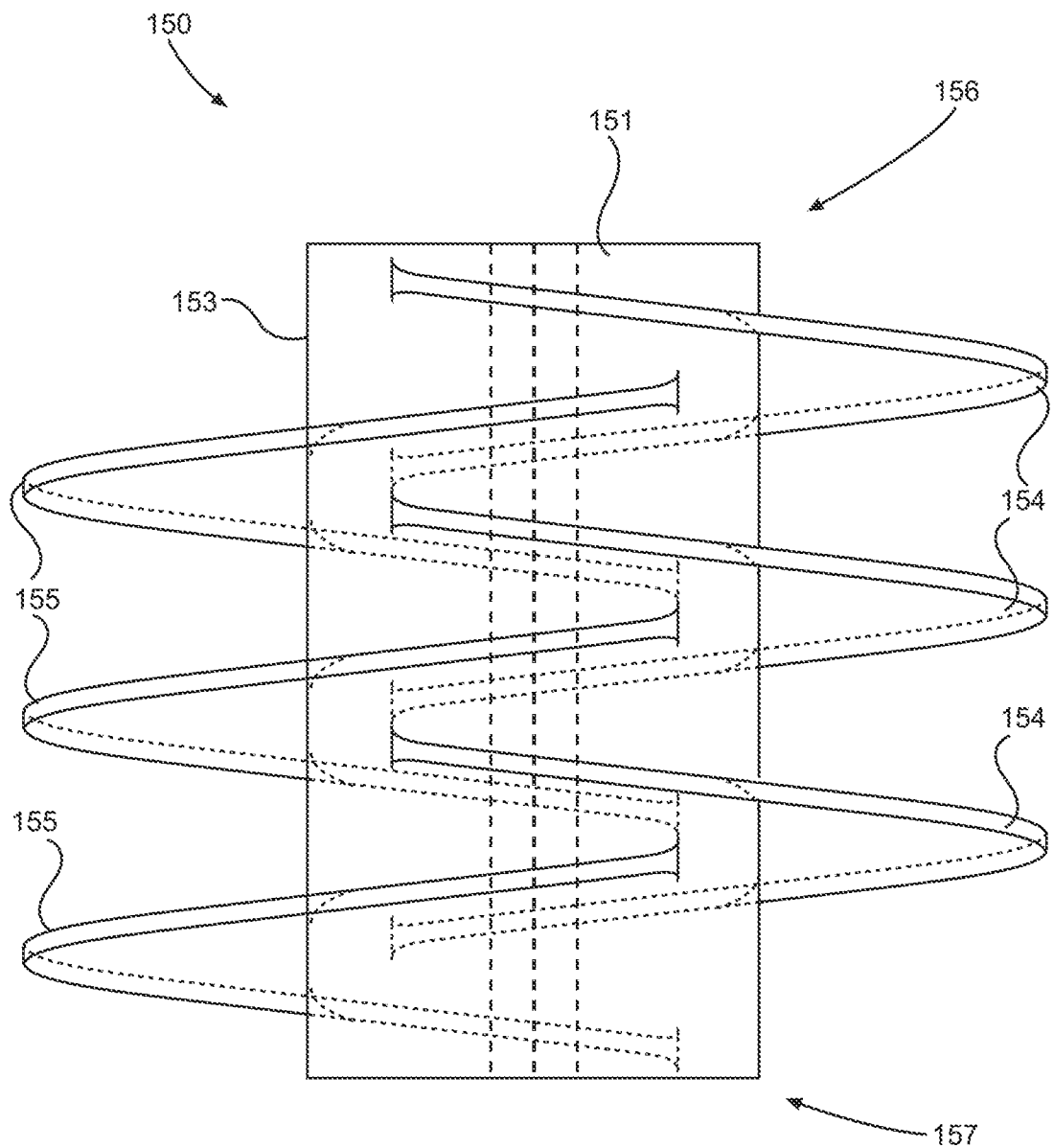
FIG. 5 illustrates in side elevation view the bidirectional fluted auger of FIG. 4 according to one embodiment of the present disclosure.

FIG. 5 illustrates in side elevation view the bidirectional fluted auger of FIG. 4. Again, bidirectional fluted auger 150 can have a flow rate limiting inner cylinder 151 that can have a front end 156, a back end 157, and an outer surface 153 to which two or more clockwise-progressing flute features 154 and two or more counterclockwise-progressing flute features 155 are attached or coupled. Each individual flute feature 154, 155 can extend only part way around inner cylinder 151, and some or all flute features 154, 155 can be interwoven.

Clockwise-progressing flute features 154 can convey a subject material toward back end 157 (i.e., toward an outlet) at a first flow rate when the cylinder is rotated clockwise and can convey the subject material toward front end 156 (i.e., away from an outlet) at a second flow rate when the cylinder is rotated counterclockwise. Similarly, counterclockwise-progressing flute features 155 can convey the subject material toward back end 157 at a third flow rate when the cylinder is rotated counterclockwise and can convey the subject material toward front end 156 at a fourth flow rate when the cylinder is rotated clockwise. Due to the design features noted above, the first flow rate can be greater than the fourth flow rate to result in an overall clockwise positive flow rate of the subject material toward back end 157 when the cylinder is rotated clockwise. Similarly, the third flow rate can be greater than the second flow rate to result in an overall counterclockwise positive flow rate of the subject material toward back end 157 when the cylinder is rotated counterclockwise.

Figure 6:
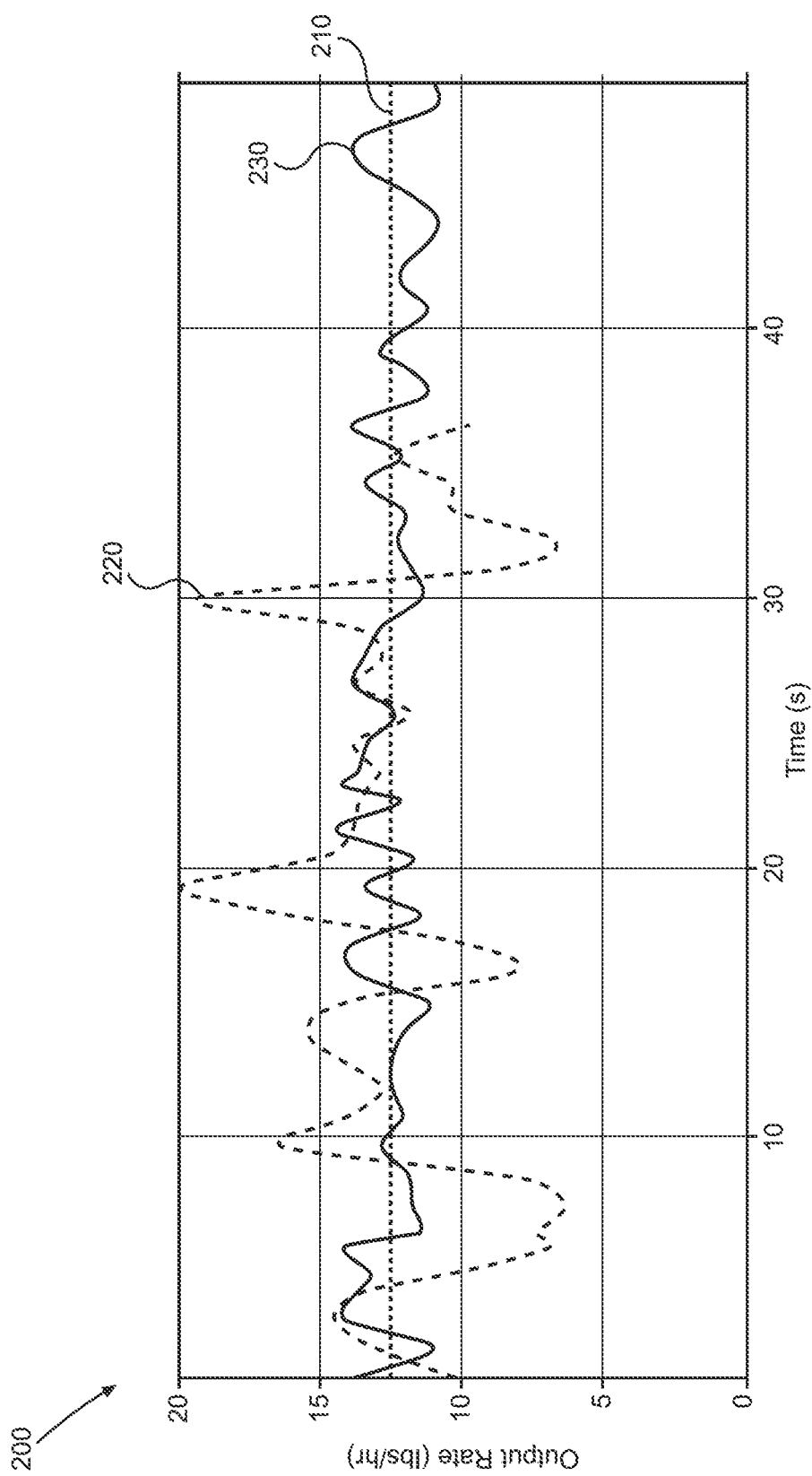
FIG. 6 illustrates a graph of comparative output flow rates using fluted augers according to one embodiment of the present disclosure.

Transitioning to FIG. 6, a graph of comparative output flow rates using fluted augers is provided. Graph 200 provides output rates in pounds per hour over time of materials being processed and conveyed by fluted augers. For non-limiting illustrative purposes, the input materials can be texturized vegetable protein and water, while the output material can be a hydrated vegetable protein resulting from the agitating and mixing of the input materials.

Output rate 210 represents an ideal output rate over time, which can be a constant rate of about 12 pounds per hour at all points in time during continuous production. It will be readily appreciated that output rate 210 is an ideal that is difficult or impossible to achieve in practical use. Output rate 220 represents an observed output rate over time using a traditional fluted auger rotating in only one direction at a constant rate of 100 rpm, for example, while output rate 230 represents an observed output rate over time using the disclosed bidirectional fluted auger oscillating back and forth between clockwise and counterclockwise rotations. In this specific non-limiting example for output rate 230, the bidirectional fluted auger was rotated at a cycle of a constant speed of about 80 rpm for about 4 seconds during a clockwise rotation and at a constant speed of about 50 rpm for about 1.5 seconds during a counterclockwise rotation. In another illustrative example, the clockwise rotation cycle can remain about the same while the counterclockwise rotation cycle can be at a speed of about 80 rpm for about 3 seconds.

As shown in graph 200, output rate 220 tends to fluctuate wildly over time from about 6 to 20 pounds per hour at any given instant. This reflects the inconsistent flow due to clumping and lumping of materials that tends to occur using a traditional fluted conveyor rotating in only one direction. Conversely, output rate 230 tends to be much more consistent and steady in comparison, staying between about 11 to 14 pounds per hour at all times. This reflects the advantages observed by being able to oscillate the rotations of the bidirectional fluted auger such that any lumps and clumps are jostled and are not readily a hindrance to the overall conveyance of all processed materials.

Figure 7:
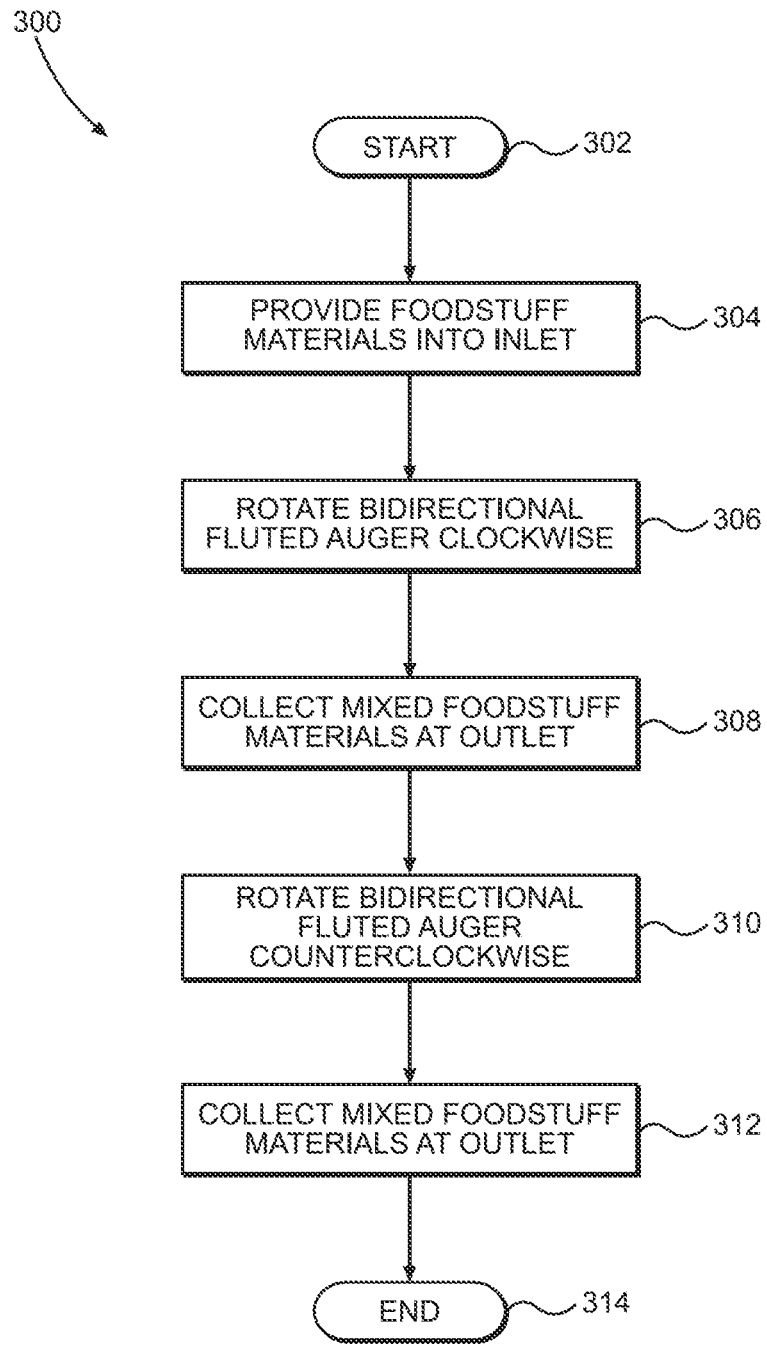
FIG. 7 illustrates a flowchart of an example method of conveying foodstuff materials using a bidirectional fluted auger according to one embodiment of the present disclosure.

Finally, FIG. 7 provides a flowchart of an example method 300 of conveying foodstuff materials using a bidirectional fluted auger. The bidirectional fluted auger can be part of a foodstuff conveying device, such as that which is set forth above in FIGS. 1-5 and the accompanying description. After a start step 302, a first process step 304 can involve providing foodstuff materials into an inlet of a foodstuff conveying device. The foodstuff materials can include, for example, texturized vegetable protein and water. Other foodstuff materials can be added or can alternatively be used at this step, as may be desired.

At the next process step 306, the bidirectional fluted auger can be rotated clockwise. This can be accomplished by rotationally driving a central shaft coupled to the bidirectional fluted auger, for example. As noted above, rotating the bidirectional fluted auger clockwise can result in the input foodstuff materials being conveyed from the inlet to an outlet of the foodstuff conveying device. Clockwise rotation can also cause the foodstuff materials to be agitated and mixed as they are being conveyed, which can turn the texturized vegetable protein into a hydrated vegetable protein. Such agitation and mixing can be accomplished by agitation components coupled to the central shaft, such as upstream of the bidirectional fluted auger.

At a next process step 308, the agitated, mixed, and conveyed foodstuff materials can be collected at the outlet of the foodstuff conveying device as or after the bidirectional fluted auger has been rotated clockwise. As noted above, the output flow rate can be steady and consistent when the clockwise rotation does not persist for too long of a time interval.

At subsequent process step 310, the bidirectional fluted auger can be rotated counterclockwise. This can also be accomplished by rotationally driving the central shaft. Again, rotating the bidirectional fluted auger counterclockwise can also result in the input foodstuff materials being conveyed from the inlet to an outlet of the foodstuff conveying device. Similar to clockwise rotation, counterclockwise rotation can also cause the foodstuff materials to be agitated and mixed as they are being conveyed.

At the next process step 312, the agitated, mixed, and conveyed foodstuff materials can be collected at the outlet of the foodstuff conveying device as or after the bidirectional fluted auger has been rotated counterclockwise. Again, the output flow rate can be steady and consistent when the counterclockwise rotation does not persist for too long of a time interval. If desired, the method can then be repeated to mix and convey additional foodstuff materials. Alternatively, the method then ends at end step 314.

It will be appreciated that the foregoing method may include additional steps not shown, and that not all steps are necessary in some embodiments. For example, additional steps may include premixing one or more of the foodstuff materials. Other steps may include adjusting the time ratios or intervals for clockwise and counterclockwise rotation. Furthermore, the order of steps may be altered as desired, and one or more steps may be performed simultaneously. For example, some continuous processes may result in all of steps 304-312 being performed simultaneously during typical production.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. An apparatus configured to process foodstuff materials, the apparatus comprising:
a hollow tube having an inlet and an outlet, the hollow tube defining a longitudinal central axis, wherein the hollow tube is configured to facilitate the conveyance of foodstuff materials from the inlet to the outlet;
a central shaft extending along the longitudinal axis, wherein the central shaft is configured to be rotationally driven in clockwise and counterclockwise directions; and
a bidirectional fluted auger coupled to the central shaft proximate the outlet and configured to rotate with the central shaft when the central shaft is rotationally driven, the bidirectional fluted auger having
a flow rate limiting inner cylinder,
clockwise-progressing flute features coupled to an outer surface of the flow rate limiting inner cylinder, and
counterclockwise-progressing flute features coupled to the outer surface of the flow rate limiting inner cylinder, wherein the clockwise-progressing flute features convey the foodstuff materials toward the outlet more than the counterclockwise-progressing flute features convey the foodstuff materials away from the outlet when the bidirectional fluted auger is rotated clockwise and the counterclockwise-progressing flute features convey the foodstuff materials toward the outlet more than the clockwise-progressing flute features convey the foodstuff materials away from the outlet when the bidirectional fluted auger is rotated counterclockwise.

2. The apparatus of claim 1, wherein the bidirectional fluted auger is located at an outlet end of the central shaft.

3. The apparatus of claim 1, further comprising:
a plurality of agitation components coupled to the central shaft, wherein the plurality of agitation components is configured to agitate the foodstuff materials being conveyed along the hollow tube.

4. The apparatus of claim 1, wherein the clockwise-progressing flute features include a plurality of clockwise oriented flutes that each extend along the flow rate limiting inner cylinder at a distance between about one-half to one whole rotation of the flow rate limiting inner cylinder.

5. The apparatus of claim 4, wherein the counterclockwise-progressing flute features include a plurality of counterclockwise oriented flutes that each extend along the flow rate limiting inner cylinder at a distance between about one-half to one whole rotation of the flow rate limiting inner cylinder.

6. The apparatus of claim 5, wherein the clockwise-progressing flute features and the counterclockwise-progressing flute features are interwoven with respect to each other.

7. The apparatus of claim 6, wherein the clockwise-progressing flute features include at least two separate clockwise oriented flutes and the counterclockwise-progressing flute features include at least two separate counterclockwise oriented flutes.

8. The apparatus of claim 1, wherein the foodstuff materials include texturized vegetable protein and water that are mixed and conveyed by the apparatus to form hydrated vegetable protein.

9. The apparatus of claim 1, wherein the outlet feeds the foodstuff materials to a separate set of fluted infeed screws.

10. The apparatus of claim 9, wherein the separate set of fluted infeed screws are asymmetric with respect to each other.

11. The apparatus of claim 1, wherein variations in the flow rate of the foodstuff materials from the outlet when the rotation of the bidirectionally fluted auger is alternated between clockwise and counterclockwise are substantially less than variations in the flow rate of the foodstuff materials from the outlet when the rotation of the bidirectionally fluted auger is constantly clockwise or constantly counterclockwise.

12. The apparatus of claim 1, further comprising:
a motor coupled to the central shaft and configured to drive the central shaft rotationally in clockwise and counterclockwise directions.

13. The apparatus of claim 12, further comprising:
a controller coupled to the motor and configured to operate the motor to drive the central shaft rotationally clockwise and counterclockwise at regularly defined intervals.

14. A fluted conveyance, comprising:
a cylinder having an outer surface, a front end, a back end, and a longitudinal rotational axis, the cylinder being configured to rotate in clockwise and counterclockwise directions;
a plurality of clockwise-progressing flute features coupled to the outer surface of the cylinder, wherein the plurality of clockwise-progressing flute features convey a subject material toward the back end of the cylinder at a first flow rate when the cylinder is rotated clockwise and convey the subject material toward the front end of the cylinder at a second flow rate when the cylinder is rotated counterclockwise; and
a plurality of counterclockwise-progressing flute features coupled to the outer surface of the cylinder, wherein the plurality of counterclockwise-progressing flute features convey the subject material toward the back end of the cylinder at a third flow rate when the cylinder is rotated counterclockwise and convey the subject material toward the front end of the cylinder at a fourth flow rate when the cylinder is rotated clockwise,
and wherein the first flow rate is greater than the fourth flow rate to result in an overall clockwise positive flow rate of the subject material toward the back end of the cylinder when the cylinder is rotated clockwise, and the third flow rate is greater than the second flow rate to result in an overall counterclockwise positive flow rate of the subject material toward the back end of the cylinder when the cylinder is rotated counterclockwise.

15. The fluted conveyance of claim 14, wherein the plurality of clockwise-progressing flute features and the plurality of counterclockwise-progressing flute features are all located proximate the back end of the cylinder.

16. The fluted conveyance of claim 14, wherein the plurality of clockwise-progressing flute features include clockwise oriented flutes that each extend along the cylinder at a distance between about one-half to one whole rotation of the cylinder, and the plurality of counterclockwise-progressing flute features include counterclockwise oriented flutes that each extend along the cylinder at a distance between about one-half to one whole rotation of the cylinder.

17. The fluted conveyance of claim 16, wherein the clockwise-progressing flute features and the counterclockwise-progressing flute features are interwoven with respect to each other.

18. The fluted conveyance of claim 15, wherein the subject material includes a foodstuff material.

19. A method of conveying foodstuff materials, the method comprising:
- providing a first foodstuff material into an inlet of a foodstuff conveying device, the foodstuff conveying device having the inlet, an outlet, and a rotating conveyor;
- inputting a second foodstuff material into the inlet;
- rotating clockwise the rotating conveyor, wherein the rotating clockwise results in the first and second foodstuff materials being conveyed from the inlet to the outlet;
- rotating counterclockwise the rotating conveyor, wherein the rotating counterclockwise results in the first and second foodstuff materials being conveyed from the inlet to the outlet; and
- collecting the first and second foodstuff materials at the outlet.

20. The method of claim 19, wherein the rotating clockwise and the rotating counterclockwise further results in mixing the first and second foodstuff materials together.

\* \* \* \* \*